United States Patent [19]

Prelat

[11] Patent Number: 5,471,056
[45] Date of Patent: Nov. 28, 1995

[54] AIRBORNE SCANNER IMAGE SPECTROMETER

[75] Inventor: Alfredo E. Prelat, Missouri City, Tex.

[73] Assignee: Texaco Inc., White Plains, N.Y.

[21] Appl. No.: 247,421

[22] Filed: May 23, 1994

Related U.S. Application Data

[63] Continuation-in-part of Ser. No. 950,519, Sep. 25, 1992, abandoned.

[51] Int. Cl.⁶ ................................................... G01J 3/50
[52] U.S. Cl. ...................... 250/253; 250/252.1; 250/332; 250/334; 250/339.07
[58] Field of Search .................... 250/339.07, 253, 250/252.1 A, 332, 334, 339.02, 339.05, 339.09, 340, 347, 349; 348/164, 165, 166; 374/43

[56] References Cited

U.S. PATENT DOCUMENTS 4,257,106  3/1981  Auer ....................................... 250/338.1
5,166,789  11/1992  Myrick ................................ 348/164 X
5,276,321  1/1994  Chang et al. .......................... 250/226
5,371,358  12/1994  Chang et al. ....................... 250/334 X

OTHER PUBLICATIONS

F. A. Krause, et al "Mapping Physical Properties of Geologic Materials by Integration of Diverse Multisprectral Image Data Sets from the Geologic Remote Sensing Field Experiment" Igarss '90 vol. 2, May 20, 1990, pp. 1351–1355.

A. B. Kahle "Surface Emittance Temperature and Thermal Inerta Derived from Thermal Infrared Multispectral Schanner Data for Death Valley, California" Geophysics vol. 52 No. 7—Jul. 1987, pp. 858–874.

K. Watson "Regional Thermal–Inertia Mapping from an Experiment Satellite" Geophysics, vol. 47, No. 12—Dec. 1982, pp. 1681, 1682, 1684 and 1686.

*Primary Examiner*—Carolyn E. Fields
*Assistant Examiner*—Edward J. Glick
*Attorney, Agent, or Firm*—James L. Bailey; Kenneth R. Priem; William J. Beard

[57] ABSTRACT

A system for making airborne surveys uses first and second surveys made at opposite points on the thermal cycle and collects hyper-spectral image data forming continuous bands in the visible, solar infrared and thermal infrared regions.

3 Claims, 2 Drawing Sheets

AIRBORNE SCANNER IMAGE SPECTROMETER

CROSS REFERENCE TO RELATED PATENT APPLICATION

The present patent application is a continuation-in-part of my earlier patent application Ser. No. 07/950,519 filed Sep. 25, 1992, now abandoned.

BACKGROUND OF THE INVENTION

1. The Field Of the Invention

The present invention relates to an airborne multi-spectral sensor system that utilizes real-time acquisition of images in many narrow, contiguous spectral bands, to generate hyperspectral image data, and in particular to image data sets which can be used individually or combined to get spectral profiles and emittance to identify ground targets.

2. The Prior Art

There are many known apparatus for making airborne surveys of terrain for many purposes. These apparatus generally have a plurality of optical scanning devices which are directed toward the ground and form images which are translated into electronic signals for rapid comparison by computers. For example U.S. Pat. No. 4,057,734 shows radiometric calibration (which is standard for scanners) as wavelength calibration to compensate for variation in the intensity of the incoming radiation due to random fluctuations. U.S. Pat. No. 4,616,134 relates to a laboratory instrument. In order to obtain the apparent thermal inertia, it is necessary to measure the difference between maximum and minimum temperature occurring during a diurnal solar cycle. At C down 1, lines 55–61 discuss differential thermal reflectance (it should be "differential thermal radiance") by heating of the sample. U.S. Pat. No. 4,908,705 shows a steerable wide-angle imaging system which is particularly effective for high speed, low altitude reconnaissance. U.S. Pat. No. 4,939,369 discloses an imaging and tracking system which utilizes multiple arrays of sensors. U.S. Pat. No. 5,028,998 concerns a system which provides an electronic zoom feature to effectively produce a constant altitude picture as the terrain varies while the airborne platform remains at a constant average altitude. U.S. Pat. No. 5,047,783 provides for improved imaging from radiation detectors by noise cancellation. U.S. Pat. No. 5,116,118 describes another airborne imaging system. U.S. Pat. No. 5,149,959 does not have substantially continuous in-flight calibration of the system to compensate for any changes which may take place between the time the system is preflight calibrated on the ground and when it is airborne and begins gathering data. It also lacks means to monitor the flight characteristics of the system through a comparison of the aircraft performance and platform performance.

SUMMARY OF THE INVENTION

The present invention is an airborne multi-spectral sensor system that utilizes real-time acquisition of images in many narrow, contiguous spectral bands, to generate hyper-spectral image data. The thus achieved image data sets are used individually or combined to obtain spectral profiles and emittance to identify ground targets. The subject system will provide simultaneous information about temperatures and albedos from which the apparent thermal inertia of materials can be calculated and thus define heat flow patterns from the interior and surface of the earth during a 24-hour thermal cycle. The subject system is particularly useful in exploration for natural resources as well as for environmental assessment.

An object of the present invention is to provide a method and apparatus to acquire, process and calculate the apparent thermal inertia of materials. The present invention preferably measures and compares the thermal emittance from the earth's surface between 8 µm to 12 µm, but the principles of the present invention equally apply to all portions of the thermal infrared spectrum.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
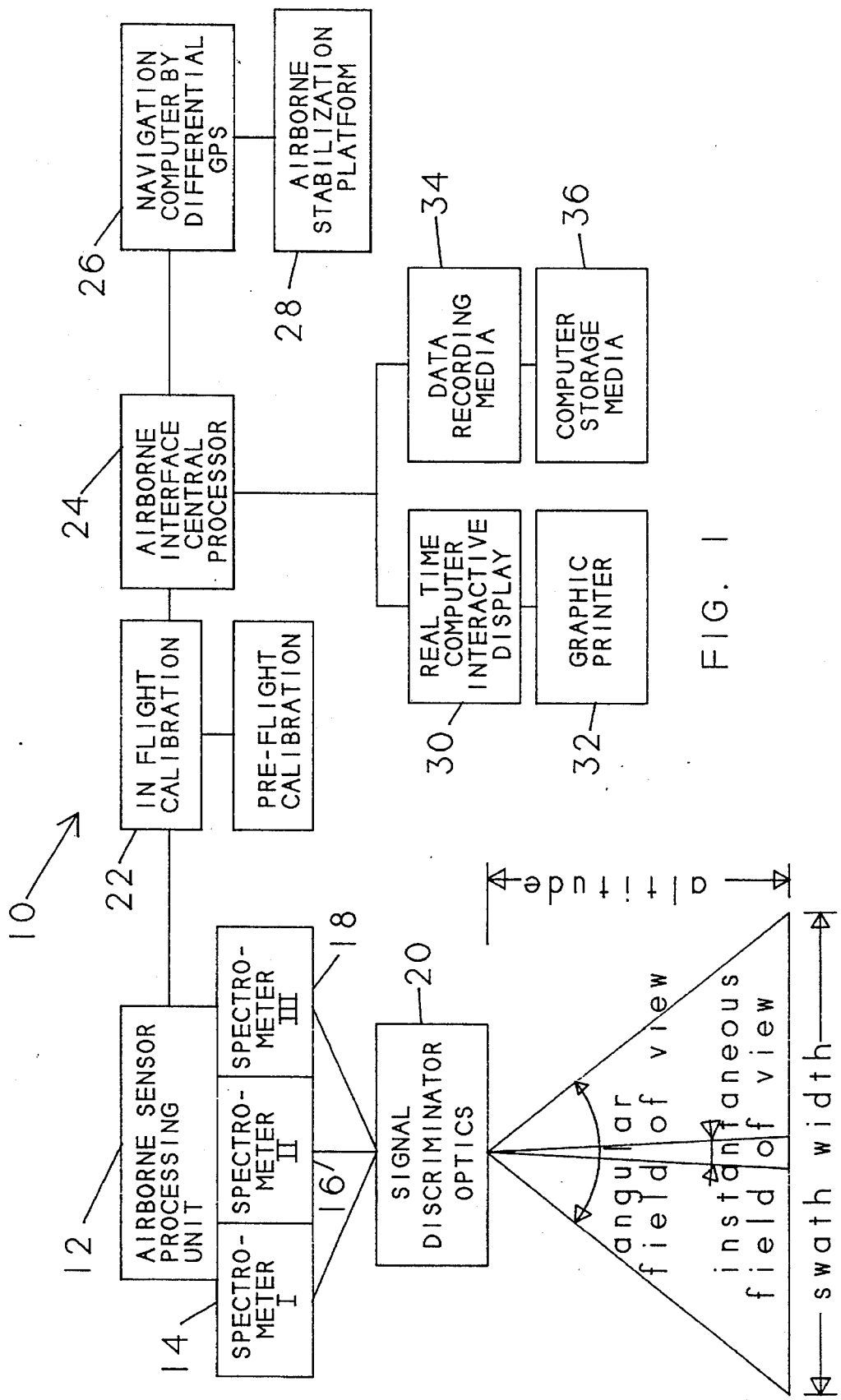
FIG. 1 is a block level schematic of the system of the present invention.

Referring now to FIG. 1, the subject system 10 has an airborne sensor processing unit 12 which includes a first plurality of spectrometers 14 forming a first contiguous selectable band from 400 to 1140 nanometers, a second plurality of spectrometers 16 forming a second contiguous band from 1400 to 2500 nanometers, and a thermal sensor array 18 formed with two configurations with the first having at least six bands running from 8.40 to 11.70 µm and the second having at least seven bands running from 8.35 to 11.45 µm. The three spectrometers 14, 16, 18 are each connected to receive input from a signal discriminator 20 having a plurality of optical sensors (not shown) of known type. These sensors would provide optical imaging for a known field of view which, at a given known altitude, will cover a determinable swath width. The sensors, by selection, would also be capable of providing an instantaneous field of view.

There are specific spectrum bands which can be preferably be analyzed by the processing unit. These include the following spectral coverage requirements for:

| Resource Exploration | |
|---|---|
| lithologic and mineral detection | |
| visible-near infrared | 400 to 1300 nanometers |
| middle infrared | 2000 to 2500 nanometers |
| thermal infrared | 8.0 to 12.0 micrometers |
| structural geologic mapping | |
| near-middle infrared | 700 to 2500 nanometers |
| thermal infrared | 8.0 to 12.0 micrometers |
| natural oil seep and stress vegetation detection | |
| visible | 400 to 700 nanometers |
| thermal infrared | 8.0 to 12.0 micrometers |
| Environmental Monitoring and Assessment | |
| oil spill detection | |
| visible | 400 to 700 nanometers |
| thermal infrared | 8.0 to 12.0 micrometers |

-continued

| vegetation biochemistry | |
|---|---|
| visible-near and middle infrared | 400 to 2500 nanometers |
| water quality | |
| visible | 400 to 700 nanometers |
| thermal infrared | 8.0 to 12.0 micrometers |
| Land Use and Land Cover Mapping | |
| visible-middle and near infrared | 400 to 2500 nanometers |
| thermal infrared | 8.0 to 12.0 micrometers |
| Natural Hazards | |
| visible, middle and near infrared | 400 to 2500 nanometers |
| thermal infrared | 8.0 to 12.0 micrometers |

It is clear from the forgoing that the spectrum of bands in which the present invention operates relates only to the project at hand rather than the entire spectrum of visible and invisible bands.

The processing unit 12 is connected to a two stage calibration means 22 which provides the capability for both in-flight and pre-flight calibration of the system. The system further includes a central processor unit 24 which is connected to receive data from the processing unit 12 as well as from airborne navigation means 26 and platform stabilization 28 in order to correctly relate the scanned data to the earth's surface. The central processor unit 24 also is connected to output devices including a real time display means 30, graphic printer 32, data recording means 34, and data storage means 36.

The purpose of on-board calibration verification is to detect and correct changes, if any, that occur during airborne operation of the scanner. The substantially continuous calibration of the system is for wavelength and radiometric calibration.

Wavelength calibration of an instrument can be verified during flight (on a continuous basis) by monitoring the recorded wavelengths of known spectral signatures which can be used during flight: atmospheric absorption bands and emission lamps. Shifts in wavelength calibration can be detected by monitoring the wavelength position of known atmospheric absorptions. In particular, the oxygen absorption at 765 micrometers produces a deep and narrow feature in the solar irradiation curve. This feature is present in all calibrated raw data. Monitoring the relative intensities of a few of the appropriate spectrometer channels in the vicinity of this absorption feature will allow detection of shifts in the wavelength calibration of the instrument.

Continuous calibration could also be carried out using emission lamps, which are small lamps with known emission properties, such as krypton pen lights, and could be incorporated into scanners and viewed at the end of a scanline. The emission features of these lamps could be used for in-flight wavelength calibration just as they are used in the laboratory for pre and post flight calibration. The laboratory calibration of the instrument should be verified before and after each flight.

In radiometric calibration, dark reference plates are used to record baseline or "dark current" readings in a series of pixels at the end of each scan line. Since a thermal scanner must view both a "hot" and a "cold" reference blackbody on every scan line. The hot and cold endpoints of known controlled temperature and date number can be used to verify the calibration of the instrument on a continuous basis.

It is important to the present invention that the spectrometers be selected such that the signal to noise ratio in the first spectrometer array is more than 500, and more than 100 for the second array. The noise-equivalent temperature difference should be @300° K. from 0.1 to 0.2K for a bandwidth of 0.2 to 0.4 μm.

The present invention utilizes high spectral and radiometric resolution imaging spectrometers, namely visible-infrared (0.4–1.1 micron) for the first array 14, solar reflected infrared (1.4–2.5 micron) for the second array 16, and thermal infrared (8–12 micron) for the third array 18. The sensor processing unit 12, containing the spectrometer assemblies 14, 16, and 18, is mounted in a known airborne platform (not shown) having the capability of informing the central processor of flight conditions, such as altitude, attitude and ground speed. The spectrometer arrays 14, 16, 18 are pre-flight calibrated for the particular survey to be conducted. As the survey progresses, the signal discriminator optics acquire images of contiguous registered spectral bands such that, for each element on the ground "pixel", a complete reflectance or emittance spectrum can be obtained from the surface surveyed. The recorded image data can be viewed in real-time by display 30 while airborne, or processed by printer 32 or recording means 34 for pre-selection of individual bands or for the whole spectrum of bands for various applications.

The capacity of the system to resolve features on the ground, in terms of spatial resolution, depends on a number of parameters, such as the instantaneous field of view, and the altitude and speed of the aircraft, known as the V/H ratio. The former is pretty much determined by the optics system 20 while the latter is determined by known means in the navigation computer 26, including the platform stabilization 28, and fed to the central processor 24. The quality of the signal to identify features on the ground, in terms of spectral resolution, depends on having arrays of detectors 14, 16, 18 which have good signal-to-noise ratios.

Known image processing techniques can be used for processing of the image data. The central processor 24 allows the operator to convert image data into radiometric units, and to perform atmospheric correction and geometric rectification, both necessitated by distortions produced by the instrument and airborne platform motion. The operator can enhance the data by combining bands, creating ratios, performing statistical analysis and applying numerical classification techniques.

Thermal inertia is a measure of the thermal response of a material to temperature changes. The units are calories per square centimeter per second square root per degree centigrade ($Cal \cdot Cm^{-2} \cdot Sec^{1/2} \cdot °C^{-1}$). The thermal inertia is defined as:

$$T_i = (\kappa \rho C)^{1/2}$$

where:
  $\kappa$=thermal conductivity
  $\rho$=density of material
  C=thermal capacity The thermal inertia can be determined by measuring the conductivity, density and thermal capacity of materials. However, by measuring the maximum and minimum radiant temperature during a diurnal solar cycle, the apparent thermal inertia of materials can be determined. The procedure is as follows:

1. Conducting a first airborne mission under conditions of expected lowest solar heating cycle and activating thermal infrared sensor means to acquire radiant temperatures in digital form.

2. Conducting a second airborne mission under conditions of expected maximum solar heating cycle and activating imaging spectrometers means scanning from visible to thermal infrared to acquire reflected energy and radiant temperatures in digital form.

3. Calculating ΔT, which is the difference between the maximum and minimum temperatures occurring during the diurnal cycle from the first and second surveys.

4. Calculating the albedo (α) from the visible bands of the second survey, the albedo being the ratio of the amount of energy reflected by a material to the energy incident on the surface of the material.

5. Calculating the apparent thermal inertia by the equation.

$$ATI = \frac{1-a}{\Delta T}$$

Figure 2:
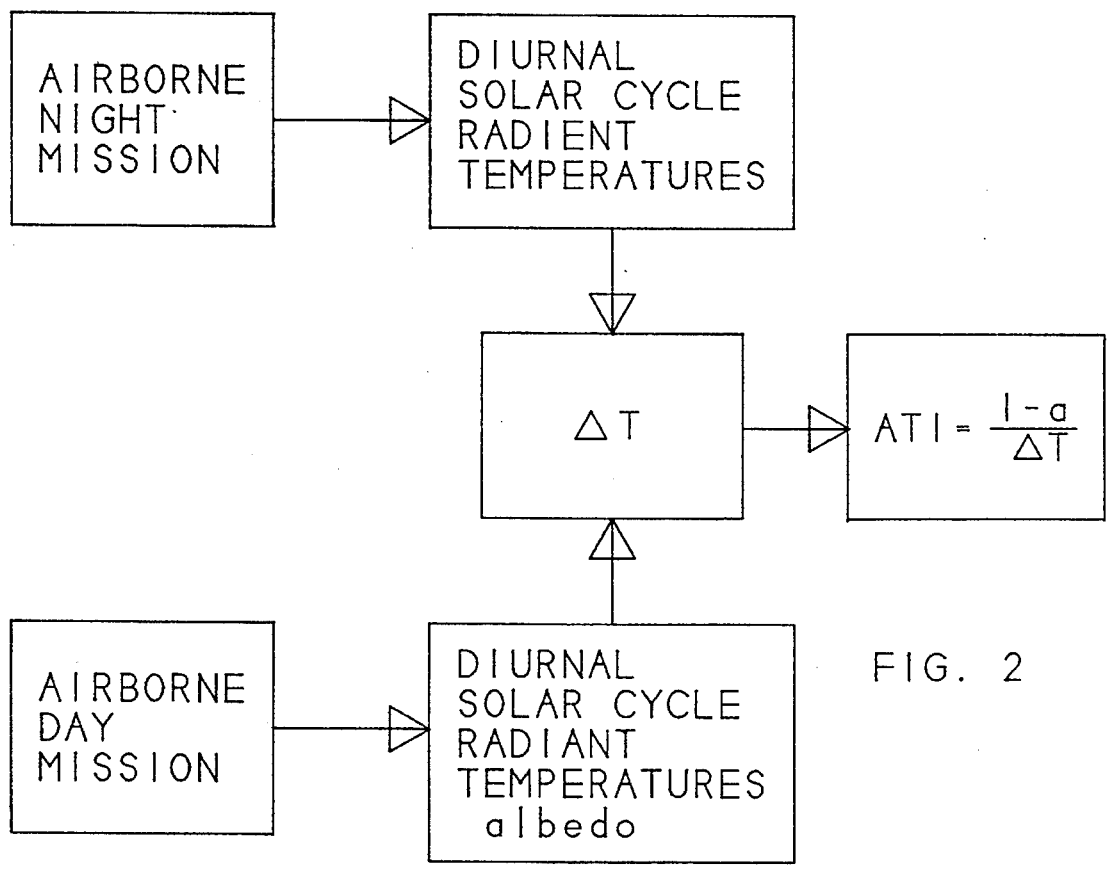
FIG. 2 is a block level schematic showing the function of the subject invention.

FIG. 2 illustrates the steps used to calculate the apparent thermal inertia. In this drawing, ΔT is the difference between the maximum and minimum temperature during the diurnal cycle, α is the albedo and ATI is the apparent thermal inertia. The minimum and maximum radiant temperatures are acquired during the first and second surveys using the thermal sensor arrays. The albedo is acquired with the imaging spectrometer during the second survey. In accordance with the flight specifications, the apparent thermal inertia can be calculated in real time during the second mission as the data are being recorded. The display provides real-time interpretation when searching for a particular target that requires a closer examination. The requirement to co-register the picture elements (pixels) from the first and second surveys is achieved by using a global positioning system (GPS). For example, when using a differential GPS system, a first receiver is placed on the airborne platform and a second receiver is placed on the ground at a benchmark. Thus accurate ground position is obtained for each pixel for both of the first and second airborne surveys.

Post-flight processing of the data allows use of more complex algorithms for analysis and display of the imaging data and thermal inertia. Software can be used to remove atmospheric effects, to compensate for shadows due to changes in terrain elevation by comparing solar elevation and azimuth with digital terrain data, and to apply thermal models to define heat flow patterns.

The present invention may be subject to many modifications and changes without departing from the spirit or essential characteristics thereof. The present embodiment should therefor be considered in all respects as being illustrative rather than restrictive of the scope of the invention as defined by the appended claims.

I claim

1. An airborne reconnaissance system capable of acquiring contiguous co-registered image data from 0.4 to 2.5 microns in wavelength and from 8–12 microns in wavelength, comprising:

a plurality of electromagnetic energy sensor arrays;

means for receiving and processing data from said sensor arrays;

calibration means for substantially continuously calibrating said system;

platform means adapted to be mounted in an aircraft for carrying said system therein;

means for determining relative flight characteristics of said platform means including the pitch, roll and yaw axes of an aircraft carrying said platform means; and central processing means for receiving data from said means to receive and process data from said sensor arrays, said means for determining relative flight characteristics and said calibration means to determine electromagnetic spectral image data characteristics for an area being surveyed.

2. The airborne reconnaissance system according to claim 1 further comprising means to view the image data in real-time while airborne.

3. The airborne survey apparatus according to claim 1 and further comprising:

image processing means for further enhancement of the image data.

\* \* \* \* \*